United States Patent
Corbett

(10) Patent No.: US 6,805,298 B1
(45) Date of Patent: Oct. 19, 2004

(54) MODULAR CEMENTITOUS THERMAL PANELS FOR RADIANT HEATING

(75) Inventor: A Hoyt Corbett, Bainbridge Island, WA (US)

(73) Assignee: Warm Brothers, Inc., Bainbridge Island, WA (US)

( * ) Notice: Subject to any disclaimer, the term of this patent is extended or adjusted under 35 U.S.C. 154(b) by 5 days.

(21) Appl. No.: 10/172,284

(22) Filed: Jun. 14, 2002

(51) Int. Cl.[7] .............................................. F24D 5/10
(52) U.S. Cl. ............................. 237/69; 237/43; 165/56
(58) Field of Search ....................... 237/69, 43; 165/56, 165/49, 171; 454/185

(56) References Cited

U.S. PATENT DOCUMENTS

| | | | |
|---|---|---|---|
| 3,037,746 A | | 6/1962 | Williams |
| 4,508,162 A | | 4/1985 | Radtke |
| 4,646,814 A | * | 3/1987 | Fennesz ........................ 165/56 |
| 4,779,673 A | | 10/1988 | Chiles et al. |
| 5,879,491 A | * | 3/1999 | Kobayashi .................... 156/71 |
| 6,092,587 A | | 7/2000 | Ingram |
| 6,152,377 A | * | 11/2000 | Fiedrich ....................... 237/69 |

OTHER PUBLICATIONS

Radiant Flooring Guide; Guide to Suitable Floor Covering and Sub–Materials for use with radiant heating; Published in affiliation with Radiant Panel Association 2002 Edition.

* cited by examiner

Primary Examiner—Derek Boles
(74) Attorney, Agent, or Firm—Graybeal Jackson Haley LLP

(57) ABSTRACT

A hydronic thermal heating panel made of cementitious material. The panel is made of Portland cement or any other cement that cures to a stony like hardness. The cement may include sand and reinforcing fibers, such as glass, polymer, or wood fibers. Like other hydronic panels, one or more groves are deep enough to entirely receive a hydronic pipe. The panel has backing material to provide strength or sufficient thickness of cementitious material beneath each groove to give adequate strength. The panel may be adhered with mortar or other adhesive or with nails or screws. The panels may be covered with mortar and tile or with any other flooring material.

27 Claims, 4 Drawing Sheets

MODULAR CEMENTITOUS THERMAL PANELS FOR RADIANT HEATING

FIELD OF INVENTION

This invention relates to building construction materials and is particularly directed to improved thermal heating panels for application of hydronic radiant heating in new and existing construction.

SUMMARY OF THE INVENTION

In one aspect, the invention is a thin, relatively dense, non structural, modular cementitious thermal mass, made into panels (or boards) for use in hydronic radiant heating. One embodiment consists of panels made of cementitious materials with a groove or grooves for placing tubing, that have been machined, extruded, molded, or pressed while the cement is soft into the panels. The grooves for placing the tubing may be undercut to retain the tube, tightly fitting to retain the tube by friction, or loose on the tube. The panels may be attached to a subfloor by means of adhesive, mortar, screws or other normal construction attachments. The panel shapes may be cast, pressed or extruded out of cementitious materials and either may or may not include the addition of reinforcing mesh, natural fibers, glass or ceramic fibers, polymers, metal filings or fibers, or filler. They may also or may not include additional layers of backing materials, metal for better heat transfer, soundproofing, insulation, reinforcement, and edge strips.

By cementitious materials I mean as relating to cement. Cement is defined as: 1) a powdered substance mixed with water and formed or applied as a paste which hardens into a stony consistency or 2) any substance formed or applied in a soft form that later hardens that stays firmly together.

By being made of a cementitious material, the product can be installed normally using standard materials and practices of the tile trades such as thin set mortar. In one embodiment, tile can be attached directly on top of it with thin set mortar or other normal tile setting materials. This has the advantage that the product can easily be installed over wood, cement or other normal sub floor materials using any glue or adhesive or attachment method known in the construction trades.

In one aspect, the invention allows easy to use methods of radiant heating that can be easily integrated into standard construction practice at a cost that is reasonable.

In another aspect, the invention provides the advantages of cement for radiant heating in a modular easy to use form without the need for pouring cement at the job site.

In another aspect, the invention provides a product that is friendly to and works well with many of the materials of the tile industry for use in installation.

DETAILED DESCRIPTION

Figure 1A:
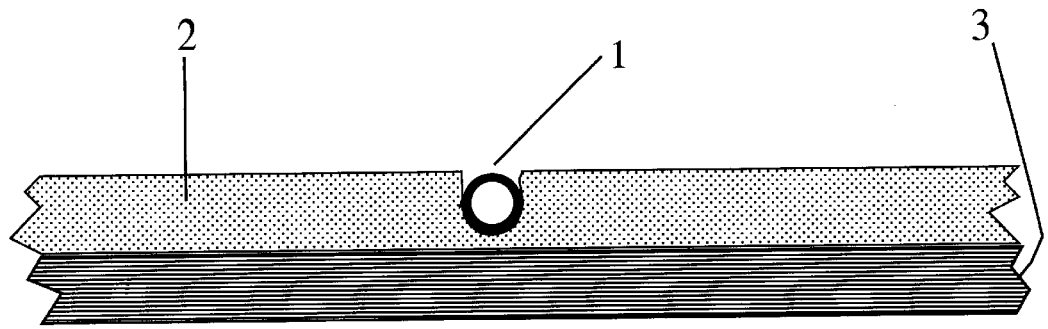
FIG. 1a shows a basic panel.

FIG. 1a is a sectional view of a panel 2 made of cementitious materials which can retain a pipe 1 in a formed groove. The panel board is normally installed by means of any combination of nailing, screwing, or adhering to a floor or sub floor 3.

For forming the panels, Portland cement is suitable, as well as any other cement that can substitute for Portland cement. The standard mixtures with sand and reinforcing fibers used for standard 4 feet by 8 feet cement boards are suitable. The sand provides good hardness for a tile base, good thermal mass, and good thermal conductivity. Alternative mixtures include plant fibers in the form of cellulose particles, filings, fibers, chips or strands of wood or other plants, glass, polymer, or ceramic fibers to increase strength and flexibility for nailing. Metal filings or fibers, such as tin, aluminum, zinc or similar alloy filings, can be added to adjust thermal mass or thermal conductivity. The additives can be adjusted to give the product desirable construction characteristics such as sawability, nailability and compatibility with construction attachment and bonding methods.

A suitable method for forming the grooves is to attach an appropriate linear shape, such as a hydronic pipe plus crack filler material such as silicone sealer, to one side of a mold for making the panels. The grooves may be given a desirable undercut shape by making the linear shape of a soft, rubbery material, such as a soft rubber pipe, that will deform as it is pulled out of the hardened panel, just like a hydronic pipe will deform when it is pushed into the groove to then snap into place, and filling the crack between the mold surface and the round pipe less than all the way out to a diameter of the pipe parallel to the mold surface. A linear shape of the preferred cross section may be extruded and then attached to the mold surface. Fibrous backing material may be placed in the other half of the mold before the cementitious material is introduced.

Another suitable method for forming the panel with straight grooves is to extrude cementitious material through a die with one or more protrusions on one side of the die to form one or more grooves, then cutting the extrusion to preferred lengths.

Each panel is preferably made no thicker than necessary to accommodate the hydronic pipe and have adequate strength. Various pipe sizes are preferred for different installations. ⅜ inch PEX pipe is popular. For this pipe, a suitable panel thickness is ⅝ inch thick.

Most of the panels are made with straight grooves. Other panels, for adjoining the straight groove panels, have 180 degree curved grooves so that a pipe can make a full turn and return to the straight groove panel or have 90 degree curved grooves. Panels can be cut with a saw at the time of installation. Suitable dimensions for the straight groove panels are 16 inches wide by 48 inches long with two lengthwise grooves in each panel.

Figure 1B:
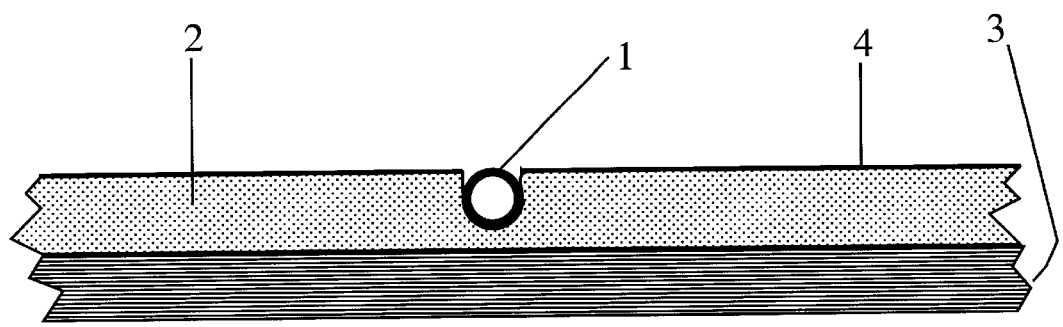
FIG. 1b shows a panel with an additional metal layer 4 on the top.

FIG. 1b is a sectional view of a panel 2 made out of cementitious materials which can retain the pipe 1 in the formed groove. The board is normally installed by means of any combination of nailing, screwing, or adhering to a floor or sub floor 3 and has an additional metal layer 4 on the top of the cementitious board, adhered by the cement itself or by an additional adhesive.

Figure 1C:
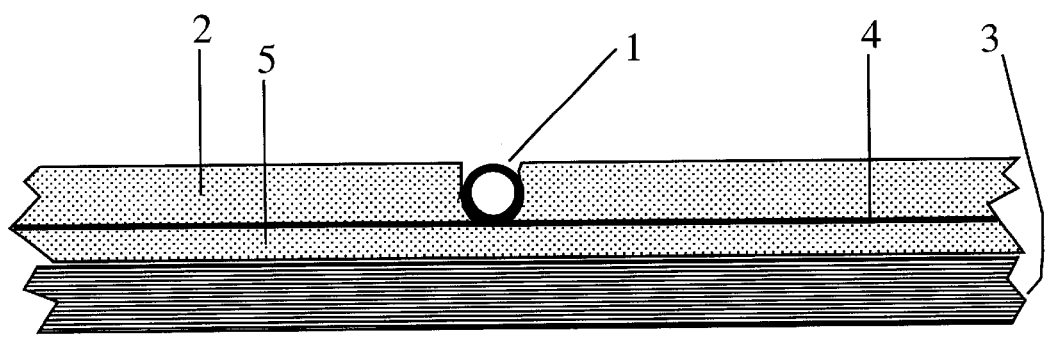
FIG. 1c shows a panel with an additional metal layer in the board and an additional layer of cementitious material under the metal layer.

FIG. 1c is a sectional view of a panel 2 made out of cementitious materials which can retain the pipe in the formed groove. The board is normally installed by means of any combination of nailing, screwing, or adhering to a floor or sub floor 3 and has an additional metal layer 4, such as aluminum or tin or zinc or similar alloy foil, in the cementitious board and includes an additional layer 5 of cementitious material under the metal layer.

Figure 2A:
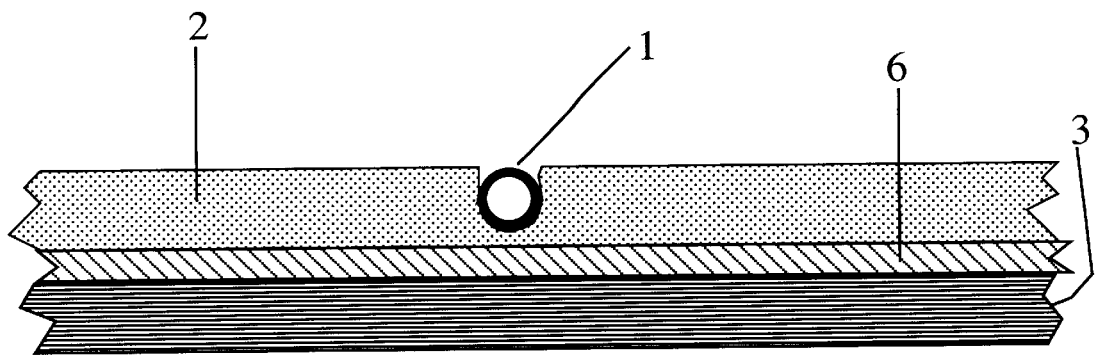
FIG. 2a shows a panel with a backing layer 6.

FIG. 2a is a sectional view of a panel 2 made out of cementitious materials which can retain the pipe 1 in the formed groove and has a backing layer 6 or layers fibrous backing material that may include wood fiber in any form such as wood, plywood, wood chips, wood fibers, wood particles, or may include reinforcing, soundproofing, or insulation materials such as an insulating board made of fiberglass and resin.

Figure 2B:
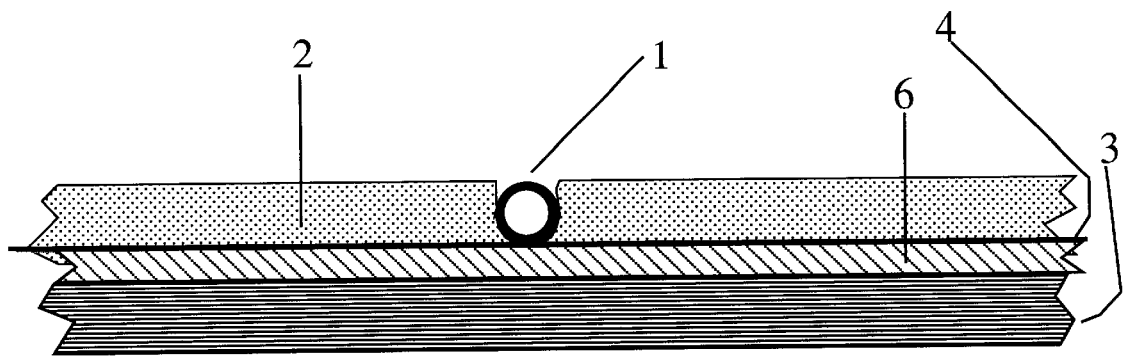
FIG. 2b shows a panel with a metallic layer 4 and a backing layer 6.

FIG. 2b is a sectional view of a panel 2 made out of cementitious materials which can retain the pipe 1 in the formed groove with the addition of an metallic layer 4 either between layers and may have a backing layer 6 or layers that may include wood, wood chips, wood fibers, wood particles, cemetitious material, reinforcing, soundproofing, or insulation materials. As shown in FIG. 2b, because the backing layer provides strength, the groove for the pipe 1 may extend entirely through the cementitious material 2.

Figure 3A:
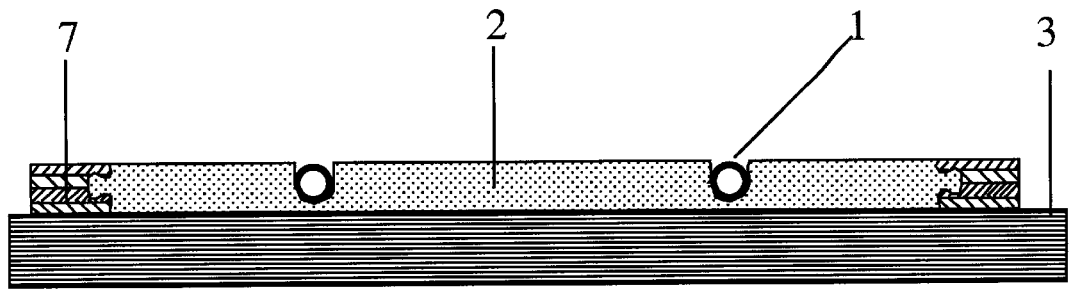
FIG. 3a shows a panel with the addition of wood strips 7 on the edges.

FIG. 3a is a sectional view of a panel 2 made out of cementitious materials which can retain the pipe in the formed groove with the addition of nailable wood in any form, such as plywood, OSB, or composite wood strips 7 on the edges as an aid for attachment to wooden floors and for the purpose of providing nailing areas for flooring materials that might be installed from above. The board is normally installed by means of any combination of nailing, screwing, or adhering to a floor or sub floor 3.

Figure 3B:
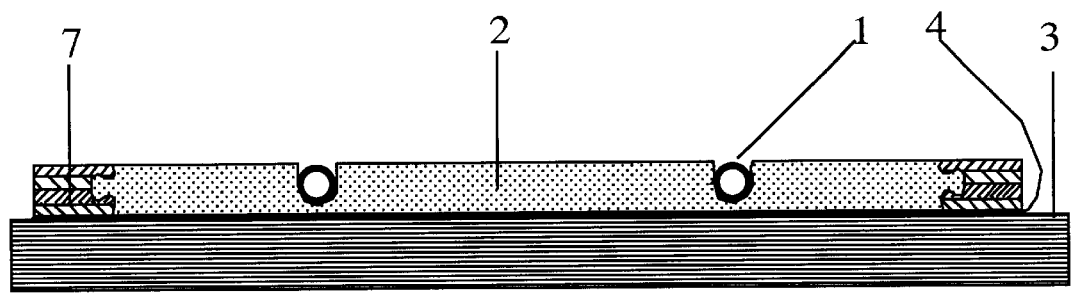
FIG. 3b shows a panel 2 with wood strips 7 on the edges and a metal layer 4 under the board.

FIG. 3b is a sectional view of a panel 2 made out of cementitious materials which can retain the pipe 1 in the formed groove with the addition of wood, plywood or composite wood strips 7 on the edges as an aid for attachment to wooden floors and for the purpose of providing nailing areas for flooring materials that might be installed from above 8 with a metal layer 4 under the board.

Figure 3C:
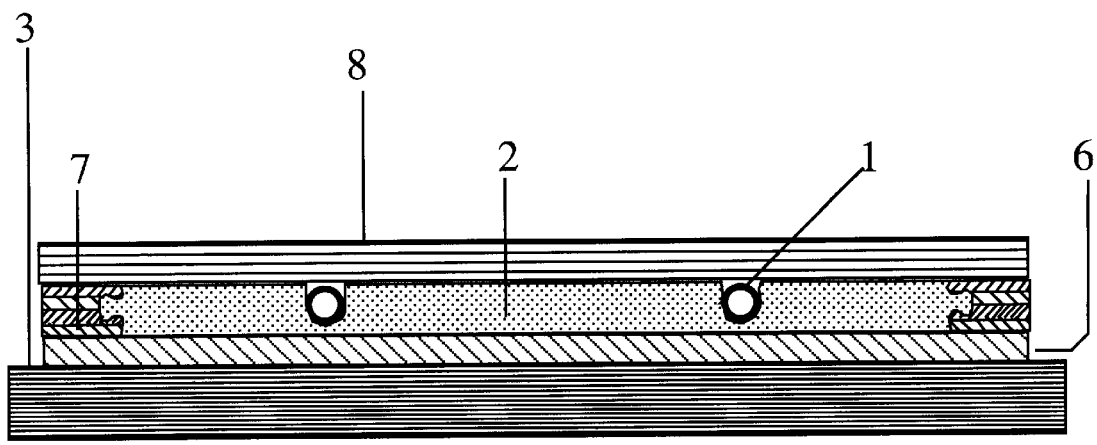
FIG. 3c shows a panel 2 with wood strips and a backing layer 6.

FIG. 3c is a sectional view of a panel 2 made out of cementitious materials which can retain the pipe in the formed groove with the addition of wood, plywood or composite wood strips on the edges as an aid for attachment to wooden floors and for the purpose of providing nailing areas for flooring materials 8 that might be installed from above and has a backing layer 6 or layers that may include wood, wood chips, wood fibers, wood particles, cemetitious material, reinforcing, soundproofing, and insulation materials.

Figure 4:
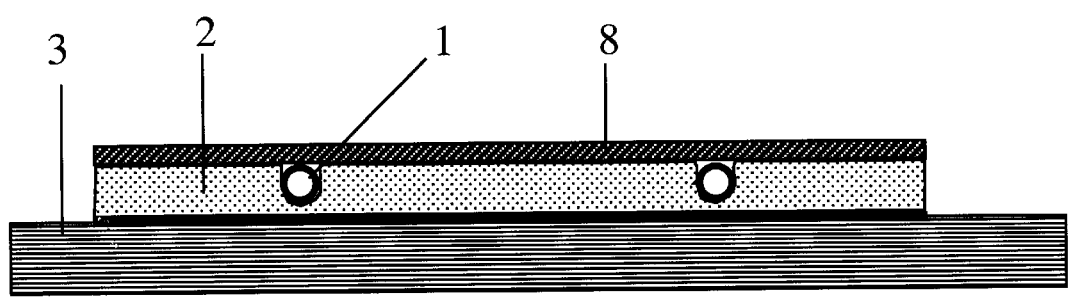
FIG. 4 shows an embodiment of the invention like FIG. 1a with a layer 8 of flooring materials applied to the top

FIG. 4 shows an embodiment of the invention like FIG. 1a with a layer 8 or layers of flooring materials applied to the top by means of any combination of nailing, screwing, or adhering.

While various embodiments of the invention have been shown, many others are possible. The scope of the invention is not to be limited by the above descriptions but only by the following claims:

I claim:

1. A method for making a cementitious panel for hydronic radiant heating, the method comprising:

(a) placing cementitious material in a mold having two sides, one side of the mold having an attached linear shape to form at least one groove in a surface of the panel;

(b) allowing the cementitious material to cure to form a panel; and (c) extracting the linear shape from the cured material, leaving a groove in the panel.

2. The method of claim 1 wherein the linear shape is undercut and forms an undercut groove.

3. The method of claim 1 wherein the cementitious material comprises Portland cement.

4. The method of claim 1 wherein the cementitious material comprises cement with reinforcing fibers.

5. The method of claim 4 wherein the reinforcing fibers comprise glass fibers.

6. The method of claim 4 wherein the reinforcing fibers comprise polymer fibers.

7. The method of claim 4 wherein the reinforcing fibers comprise plant fibers.

8. The method of claim 1 further comprising adding a layer of fibrous backing material.

9. A cementitious panel for hydronic radiant heating made by the method of claim 1.

10. A cementitious panel for hydronic radiant heating made by the method of claim 2.

11. A cementitious panel for hydronic radiant heating made by the method of claim 3.

12. A cementitious panel for hydronic radiant heating made by the method of claim 4.

13. A cementitious panel for hydronic radiant heating made by the method of claim 5.

14. A cementitious panel for hydronic radiant heating made by the method of claim 6.

15. A cementitious panel for hydronic radiant heating made by the method of claim 7.

16. A cementitious panel for hydronic radiant heating made by the method of claim 8.

17. A method for making a cementitious panel for hydronic radiant heating, the method comprising:

(a) extruding cementitious material through a die having two sides, one side of the die having at least one protrusion to form at least one groove in a surface of the panel;

(b) allowing the cementitious material to cure; and (c) cutting the extruded material to form a panel.

18. The method of claim 17 wherein the linear protrusion is undercut and forms an undercut groove.

19. The method of claim 17 wherein the cementitious material comprises Portland cement.

20. The method of claim 17 wherein the cementitious material comprises cement with reinforcing fibers.

21. The method of claim 20 wherein the reinforcing fibers comprise glass fibers.

22. The method of claim 20 wherein the reinforcing fibers comprise polymer fibers.

23. The method of claim 20 herein the reinforcing fibers comprise plant fibers.

24. A cementitious panel for hydronic radiant heating made by the method of claim 17.

25. A cementitious panel for hydronic radiant heating made by the method of claim 18.

26. A cementitious panel for hydronic radiant heating made by the method of claim 19.

27. A cementitious panel for hydronic radiant heating made by the method of claim 20.

* * * * *